United States Patent [19]

Kusuyama

[11] Patent Number: 5,294,300
[45] Date of Patent: Mar. 15, 1994

[54] PRODUCTION METHOD OF EXPANDED GRAPHITE SHEET AND EXPANDED GRAPHITE SHEET OBTAINED THEREBY

[75] Inventor: Toshiki Kusuyama, Wakayama, Japan

[73] Assignee: Toyo Tanso Co., Ltd., Osaka, Japan

[21] Appl. No.: 914,565

[22] Filed: Jul. 20, 1992

[30] Foreign Application Priority Data

Jun. 21, 1991 [JP] Japan .................................. 3-177412

[51] Int. Cl.$^5$ ............................................ D21H 13/26
[52] U.S. Cl. ............................... 162/157.3; 162/168.1; 162/169; 162/181.9
[58] Field of Search .................. 162/146, 157.3, 181.9, 162/169, 168.1; 277/235 B, 227, DIG. 6

[56] References Cited

U.S. PATENT DOCUMENTS

| | | | |
|---|---|---|---|
| 4,443,517 | 4/1984 | Shah .................. | 162/181.9 |
| 4,524,158 | 6/1985 | Barber ................ | 162/157.3 |
| 4,548,678 | 10/1985 | Laflin et al. ........ | 162/181.9 |
| 5,084,136 | 1/1992 | Haines et al. ........ | 162/157.3 |

*Primary Examiner*—Peter Chin
*Attorney, Agent, or Firm*—Armstrong, Westerman, Hattori, McLeland & Naughton

[57] ABSTRACT

An expanded graphite sheet of very large mechanical strength can be produced by compressing a graphite expanded to not less than 50 times as large as normal state in average to be 0.02 to 0.3 g/cm$^3$ in bulk density, grounding the compressed graphite particles, preparing a slurry together with a fibrilated aramid pulp fiber, and applying a wet process to the slurry to be prepared into a paper.

5 Claims, 1 Drawing Sheet

PRODUCTION METHOD OF EXPANDED GRAPHITE SHEET AND EXPANDED GRAPHITE SHEET OBTAINED THEREBY

BACKGROUND OF THE INVENTION

1. Field of the invention

The present invention relates to an expanded graphite sheet and production method thereof and, more particularly, to a heat resistant and asbestos-free graphite sheet which is utilized in gaskets or the like for sealing various joints of internal combustion engine and in other industrial purposes, and a production method thereof.

2. Description of the Related Art

Hithereto, joint sheets and beater sheets mainly composed of asbestos have been used as conventional gaskets or the like. Use of asbestos, however, has been increasingly regulated due to its harmfulness for the health.

Flexible expanded graphite sheet has been also known. This sheet is superior in sealing performance and heat resistance, but inferior in mechanical strength. Moreover, the sheet is difficult to handle in practical use and deficient in water resistance and oil resistance.

In substitution for the mentioned sheets, a sheet has been developed, in which filler is applied to aramid pulp or inorganic fiber and rubber-like elastic material is utilized as a binder. This sheet is produced by either a dry process or a wet process. However, this sheet is also inferior to asbestos sheet in mechanical strength, heat resistance and sealing performance.

Under such circumstances, improvement of the flexible expanded graphite has been attempted. For example, in the Japanese Laid-Open Patent Publication (unexamined) No. 124767/1990, it is disclosed that a rubber-like elastic binder is applied to expanded graphite particles to improve the bending breakdown resistance and oil resistance of the sheet, but has not advanced yet to the level of put a single compact thus formed into practical use. In the Japanese Laid-Open Patent Publication (unexamined) No. 288180/1987, another improvement is proposed in which an expanded graphite is impregnated with a thermosetting resin, and the resin is heated and dried to improve mechanical strength and liquid permeability. In this prior art, however, there arises a problem of losing flexibility which is the most important property, and moreover a problem of how to handle the product has not been solved yet. Furthermore, Japanese Laid-Open Patent Publications (unexamined) Nos. 71578/1985 and 72780/1988 disclose a method for mixing expanded graphite particles with reinforcing fiber or a binder. Various advantages of these prior arts are not sufficient to overcome the problems of brittleness and poor mechanical strength.

SUMMARY OF THE INVENTION

The present invention was made to solve the above discussed problem pertinent to the graphite sheet, particularly, to expanded graphite sheet, and has an object of developing a novel asbestos-free expanded graphite sheet of superior mechanical strength.

In order to accomplish the foregoing object a method for producing the asbestos-free expanded graphite sheet according to the present invention comprises the steps of: compressing a graphite preliminarily expanded to not less than 50 times as large as normal state in average so as to be 0.02 to 0.3 g/cm$^3$ in bulk density; grinding the compressed graphite: suspending the above ground graphite into water in the presence of a binder together with a reinforcing fiber formed by fibrilating an aramid pulp fiber so as to be not less than 3.0 m$^2$/g in specific surface, thus obtaining a paper making slurry; and wet-processing the slurry to be formed into a sheet.

In the present invention, the expanded graphite is first compressed to a predetermined bulk density. A graphite expanded to not less than 50 times as large as normal state in average is not uniformly suspended into water to be a slurry no matter how it is ground, and cannot be made into a paper due to floating of graphite particles on the surface of the water. In this respect, a method of utilizing a small amount of hydrophilic solvent such as acetone is known, but graphite particles tend to still float on the water even if employing such solvent, and this method is not a definite means of solution to the problem.

Thus, no uniform sheet is obtained with the conventional ground graphite as it is even if trying to make them into a paper. If something like a sheet is obtained, mechanical strength thereof is very poor and not suited for practical use. For that reason, in the invention, the expanded graphite particles are first subject to compression to be 0.02 to 0.3 g/cm$^3$, preferably 0.05 to 0.15 g/cm$^3$, in bulk density.

If the bulk density is smaller than 0.02 g/cm$^3$, expanded gas existing in the hollow pores of the expanded graphite particles is not discharged, but the graphite particles (i.e., material) remain floating no matter how they are ground and stirred in the water. On the contrary, if the bulk density is larger than 0.3 g/cm$^3$, not only the grinding in the water is difficult but also the ground material being transformed into grains tends to lose the characteristics of expanded graphite. When grinding a material in the range of the mentioned bulk density, the ground expanded graphite tends not to lose the required characteristics, and is successfully suspended into water and fixed to the aramid pulp fiber resulting in an ideal paper material.

As for the means for compressing the graphite expanded 50 times as large as normal state, any means may be employed in principle as far as a required bulk density is obtained thereby, and in particular it is preferable to employ compressive means capable of continuously compressing the material in a combination of a horizontal conveyor and an inclined conveyor.

In this respect, the compression for obtaining a bulk density of 0.05 to 0.1 g/cm$^3$ according to the invention may be achieved by the known method as disclosed in the Japanese Patent Publication No. 71694/1978 in which casing of wire gauze is used. In this known method, however, mass production is difficult.

In the present invention, an expanded graphite which has been expanded to not less than 50 times in average as large as normal is employed. Accordingly, not only the graphite particles alone expanded to not less than 50 times but also a mixture of a graphite expanded to be less than 50 times with another graphite expanded to not less than 50 times so as to be not less than 50 times in its entirety may be employed in the invention. Anyway, it is clearly acknowledged that expansion of less than 50 times in average brings about a decline in flexibility and sealing performance of the sheet.

The compressed graphite is then ground in the invention. In the grinding step, either a wet process or a dry process can be employed. In the wet process, the compressed graphite is ground in a state preliminarily mixed with water, and the ground objects thus obtained are used as they are to be prepared into slurry. It is preferable to employ a customary mixer type grinder as a grinder means. It is also preferable to employ a beater used in the field of paper making. Size of the ground objects is usually not larger than 50 meshes, preferably about 60 to 100 meshes.

In the dry process, the compressed graphite is ground to the same size as the foregoing wet process in the absence of water. It is preferable to employ a grinder utilizing shearing force, such as a high speed mixer, for example. The objects ground by a dry process may be mixed with water beforehand, then prepared into slurry. It is also preferable to make the ground objects directly into slurry.

The reinforcing fiber employed in the invention causes the expanded graphite particles to fix thereto in the water and be dispersed evenly without separation when diluted to a required concentration. This function of even or uniform dispersion is a key factor for obtaining an expanded graphite sheet of high strength. To satisfy such conditions without fail, the reinforcing fiber should have the following characteristics:

(1) The reinforcing fiber is neutral or positive in ion polarity.

As the expanded graphite particles is anionic in the water, perfect fixation thereof is not achieved no matter how fibrilation is carried out by beating a fiber of the same ion as is done in cellulose fiber.

(2) After the steps of beating the fiber and fibrilating it, specific surface of the fiber is not less than 3.0 m$^2$/g.

As the specific surface of the expanded graphite particles is large, it becomes necessary that the fiber for causing the graphite particles to fix thereto is also fibrilated to be not less than 3.0 m$^2$/g in specific surface, so that absorption may be physically easy. In this sense, the technical advantage of reinforcement is not achieved by employing any inorganic fiber or metallic fiber.

Consequently, a reinforcing fiber composed of pulped para-aramid or meta-aramid fiber of superior heat resistance can satisfy the aforementioned conditions most effectively.

Aramid fiber itself is well known, and various kinds of conventionally known aramid fibers can be used in the invention. Any of those aramid fibers is employed through fibrilation so as to be of a required specific surface. Means of fibrilation are not particularly defined and any known means can be employed. Specific surface is required to be not less than 3.0 m$^2$/g, preferably 5.0 to 8.0 m$^2$/g. If less than 3.0 m$^2$/g, there arises a disadvantage of poor fixation of graphite particles.

As for amount of use of such aramid fiber in the slurry, 3 to 25 parts by weight of aramid fiber, preferably 5 to 15 parts by weight, are used.

To improve the mechanical strength of the obtained sheet, a binder is also used in the invention. Water-soluble binder, emulsion type binder and powder binder are all employable, and among them emulsion type is particularly preferable because this type of binder is composed of fine particles easy to be dispersed in water and fixed gradually. Latex of NR, NBR, CR and acrylic rubber is preferably added according to specific use considering such characteristics as strength, heat resistance, oil resistance, etc. When a further high heat resistance is required, it is preferable to employ phenol resin and NBR latex together or an emulsion of silicon rubber and fluoro-rubber and the like.

Each of the aforementioned materials is then suspended into water to be made into a paper-making slurry in the following mix proportion:
  Expanded graphite particles: 60 to 90 parts by weight
  Aramid pulp: 3 to 25 parts by weight
  Binder: 1 to 20 parts by weight For obtaining a sheet of superior strength and heat resistance having a tensile strength of not less than 1.0 kg/mm$^2$, a following mix proportion is preferable:
  Expanded graphite particles: 70 to 85 parts by weight
  Aramid pulp: 5 to 10 parts by weight
  Binder: 3 to 10 parts by weight It is to be noted that, in the solution of mentioned material, the expanded graphite particles are fixed using the aramid pulp as a nucleus, and therefore no separation takes place but even diffusion is achieved without floating on the water when diluting the material solution to 1 to 2% in concentration. In this manner, a sheet of high strength can be obtained by means of a paper-making apparatus.

For preparing a paper-making slurry into a paper, a wet process is usually employed. Conventionally known conditions for such a wet process itself and paper making apparatus can be appropriately utilized.

The sheet thus obtained from an expanded graphite according to the invention is very high in mechanical strength, superior in heat resistance and sealing performance, sufficient in flexibility, and therefore quite preferably formed into gaskets for sealing various joint surfaces of an internal combustion engine or for other industrial uses.

In addition, the specific surfaces are measured by BET method using a mixed gas of N$_2$ (30%) and He (70%).

In the sheet of the above composition and function according to the present invention, mechanical strength and flexibility are significantly improved as compared with the flexible expanded graphite sheet according to the prior art, and easy to handle in practical use. Furthermore, other characteristics such as water resistance, and oil resistance are also improved thereby substantially satisfying JIS standard on asbestos joint sheet. A sheet having the aforementioned features according to the present invention can be widely used not only as a gasket for industries in general but also as a gasket for sealing various joints in internal combustion engine.

Other objects, features and advantages of the invention will become apparent in the course of the following description of the preferred embodiment with reference to the accompanying drawings.

DESCRIPTION OF THE PREFERRED EMBODIMENTS

Figure 1:
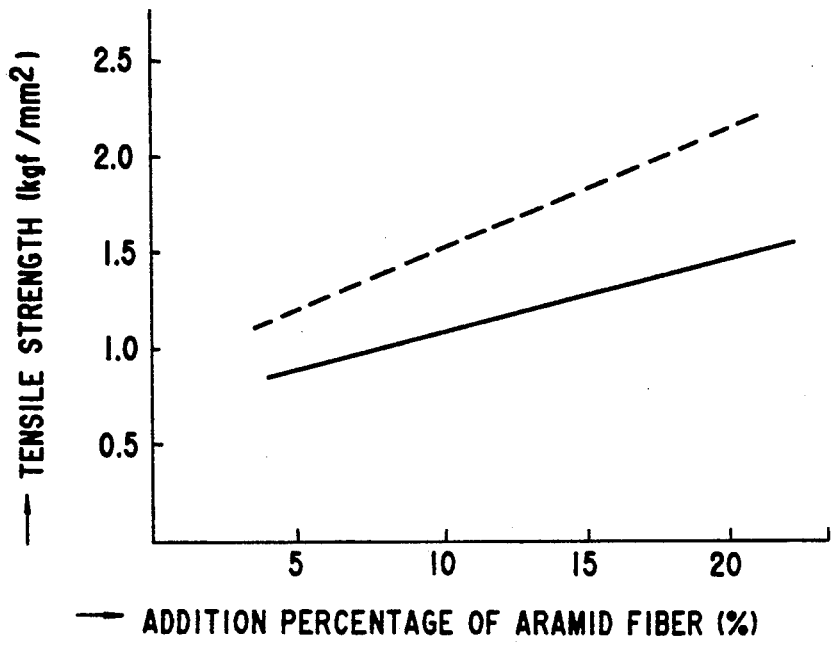
FIGS. 1 and 2 are graphs respectively showing a relation between mix proportion of graphite sheet material and tensile strength, and a relation between mix proportion of graphite sheet material and stress relaxation.

Several examples of the present invention are hereinafter described in detail, although the invention is not restricted thereto. In addition, unless otherwise specified herein, units are shown in parts by weight throughout the examples.

EXAMPLE 1

200 parts of water and 10 parts of aramid fiber pulp (trade name: Twalon pulp 1096 produced by Aczo) were placed in a mixer, then the pulp was stirred for about five minutes, beaten, and dropped into a mixing chest together with additional 3000 parts of water (Specific surface of the pulp at this time was 7.5 m$^2$/g).

In the meantime, 85 parts of graphite particles expanded to 150 times as large as normal state were compressed to form a sponge so that bulk density thereof was 0.08 g/cm$^3$. This material was placed into the mixer together with 2000 parts of water, then stirred, ground and dropped into the mixing chest, whereby the material was mixed with the foregoing aramid pulp. After stirring for 1 to 2 minutes, the particles of expanded graphite were coagulated utilizing the aramid pulp as nucleus, thus a solution of even dispersion being obtained. Then, 5 parts (calculated in solid) of NB latex (trade name: Nippol 1571 produced by Nippon Zeon) were added, and fixed after stirring for 3 to 4 minutes. In this step, because the mixed amount of aramid pulp was rather small, the NBR latex was fixed only by the stirring step alone. A small amount of white zinc was also added as assistant crosslinking agent for NBR.

The obtained product was then put in a tank equipped with a pickup net and dispersed uniformly, and drained, a sheet being thus obtained. The obtained sheet was then subject to suction of water by a suction pump, and dewatering by wrapping it in a felt to be compressed by a press. The sheet was then placed in an oven for drying at 120°, and density of the sheet was adjusted to 1.3 g/cm$^3$ by passing through calender rollers.

Finally crosslinking was carried out at 150° C. for 20 minutes.

EXAMPLE 2

A sheet was formed in the same manner as the foregoing Example 1 except that 15 parts of aramid pulp, 75 parts of expanded graphite and 10 parts (calculated in solid) of NBR latex were used. In this example, since an increased amount of pulp and binder was used, poor fixation of the late was forecast. To meet this, in the fixation, a cationic flocculant such as aqueous solution of 0.1 part of Sanflock CH799P (produced by Sanyo Chemical Industries) was added.

EXAMPLES 3 to 8

A sheet was formed in the same manner as the foregoing Examples 1 and 2 except that the mix proportion of expanded graphite, aramid pulp and NBR latex was varied as shown in Table 1.

Characteristics of the flexible expanded graphite sheet obtained in Examples 1 and 2 were measured according to JIS R 3453. Results of the measurement was compared with the standard values of Class 1, 2 and 3 prescribed in JIS R 3453, as shown in Table 2.

It is clearly understood from Table 2 that the characteristics of respective sheets in Examples 1 and 2 satisfy the standard values of JIS R 3453.

Particularly in the flexibility test "performed by bending a test piece by 180° along an iron rod of which diameter is twelve times as thick as the test piece" prescribed in this standard, no crack was recognized at all in the sheets (Examples 1 and 2), as shown in Table 2.

As comparative examples, several graphite sheets prepared just by compressing an expanded graphite alone without aramid fiber and binder (for example, trade name: Permafoil or PF sheet produced by Toyo Tanso) were subject to the same tests. In the flexibility test, all of these comparative examples were found cracked.

The foregoing characteristics of the sheet according to the invention brings about a very desirable fluid sealing performance when utilizing the sheet as gasket material.

On every sheet obtained in the foregoing Examples 1 to 8 (i.e., for each of the sheets with varied addition amount of reinforcing agent and binder), a relation between variation (mix proportion) of the additives and tensile strength and a relation between variation (mix proportion) of the additives and stress relaxation were measured. Results of the measurement are shown in FIG. 1 (tensile strength) and FIG. 2 (stress relaxation) respectively. In these graphs, dot line shows a case when mix proportion of NBR is 10%, and solid line shows another case when the mix proportion thereof is 5%.

Figure 2:
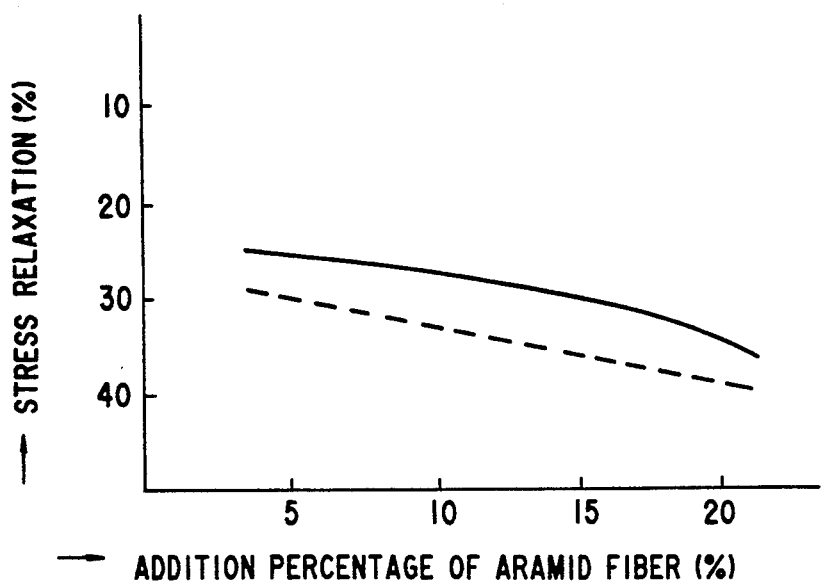

It is clearly understood from FIGS. 1 and 2 that when varying addition amount, tensile strength and stress relaxation of the sheet are also varied accordingly. More specifically, when increasing mix proportion of these additives, the tensile strength of the sheet becomes large, while stress relaxation, being one of heat resistance indexes, is decreased. As a result, any required sheet can be formed by optionally selecting the addition amount of reinforcing agent and binder.

TABLE 1

|  | NBR latex | Expanded graphite | Aramid pulp | Example |
|---|---|---|---|---|
| Group I | 5 | 90 | 5 | 3 |
|  |  | 85 | 10 | 1 |
|  |  | 80 | 15 | 4 |
|  |  | 75 | 20 | 5 |
| Group II | 10 | 85 | 5 | 6 |
|  |  | 80 | 10 | 7 |
|  |  | 75 | 15 | 2 |
|  |  | 70 | 20 | 8 |

TABLE 2

|  | JIS R 3453 | | | Invented product | |
|---|---|---|---|---|---|
|  | Class 1 | Class 2 | Class 3 | Example 1 | Example 2 |
| Tensile strength (kgf/mm$^2$) | not less than 1.6 | not less than 1.0 | not less than 1.4 | 1.19 | 1.83 |
| Compression (%) | 12 ± 5 | 12 ± 5 | 12 ± 5 | 14.4 | 15.3 |
| Recovery (%) | not less than 45 | not less than 35 | not less than 40 | 52.5 | 56.4 |
| Oil resistance | | | | | |
| Thickness increase (%) | not more than 30 | — | not more than 15 | 4.1 | 4.6 |
| Tensile strength decrease (%) | not more than 40 | — | not more than 30 | 5.9 | 12.5 |
| Oil combustion resistance | | | | | |

TABLE 2-continued

|  | JIS R 3453 | | | Invented product | |
| --- | --- | --- | --- | --- | --- |
|  | Class 1 | Class 2 | Class 3 | Example 1 | Example 2 |
| Thickness increase (%) | — | — | not more than 20 | 2.1 | 2.2 |
| Tensile strength increase (%) | — | — | not more than 20 | 15.4 | 19.0 |
| Flexibility | not broken | not broken | not broken | not broken | not broken |
| Steaming test | | | | | |
| Tensile strength decrease (%) | not more than 50 | not more than 50 | not more than 50 | 5.1 | 3.6 |
| Stress relaxation (%) | not more than 40 | not more than 50 | not more than 40 | 28.2 | 32.0 |

What is claimed is:

1. A method for producing an expanded graphite sheet for use as a gasket material, comprising the steps of:
   preliminarily expanding graphite particles to not less than 50 times their average normal size;
   compressing the graphite particles to obtain a bulk density between 0.02 g/cm$^3$ and 0.3 g/cm$^3$;
   grinding the compressed graphite particles to a size not greater than 50 mesh;
   suspending the ground graphite particles in water in the presence of a binder and a reinforcing fiber formed by fibrillating an aramid pulp fiber to have a specific surface area not less than 3.0 m$^2$/g to obtain a paper-making slurry; and
   wet-processing the slurry into a sheet,
   wherein the slurry consists of 60 to 95 parts by weight of the graphite particles, 3 to 25 parts by weight of the reinforcing fiber, and 1 to 20 parts by weight of the binder.

2. A method for producing an expanded graphite sheet according to claim 1, wherein the compressed expanded graphite particles are ground by a wet process.

3. A method for producing an expanded graphite sheet according to claim 1, wherein said grinding step grinds the compressed graphite particles to a size between 60 to 100 meshes.

4. An expanded graphite sheet used as a gasket material, comprising:
   compressed and ground graphite particles obtained by compressing graphite particles preliminarily expanded to not less than 50 times their average normal size to obtain a bulk density between 0.02 g/cm$^3$ and 0.3 g/cm$^3$ and grinding said compressed graphite particles to a size not greater than 50 mesh;
   a reinforcing fiber formed by fibrillating an aramid pulp fiber to have a specific surface area not less than 3.0 m$^2$/g;
   a binder; and
   water,
   wherein said compressed and ground graphite particles, said reinforcing fiber, said binder and said water are suspended together in a slurry subject to a wet-process for preparation into a sheet, and wherein the slurry consists of 60 to 95 parts by weight of the graphite particles, 3 to 25 parts by weight of the reinforcing fiber and 1 to 20 parts by weight of the binder.

5. An expanded graphite sheet according to claim 4 in which no crack (visibly recognized from outside to inside) occurs as a result of a test performed by picking up three test pieces each comprising said reinforcing aramid pulp fiber, said binder and said compressed ground graphite particles, and 25×150 m/m in dimensions, and bending each of the test pieces by 180° along an iron rod of which diameter is twelve times as thick as the test piece.

* * * * *